Feb. 4, 1958 F. T. LITTELL 2,822,521
GRID NETWORK FOR PULSED OSCILLATOR
Filed Dec. 23, 1953
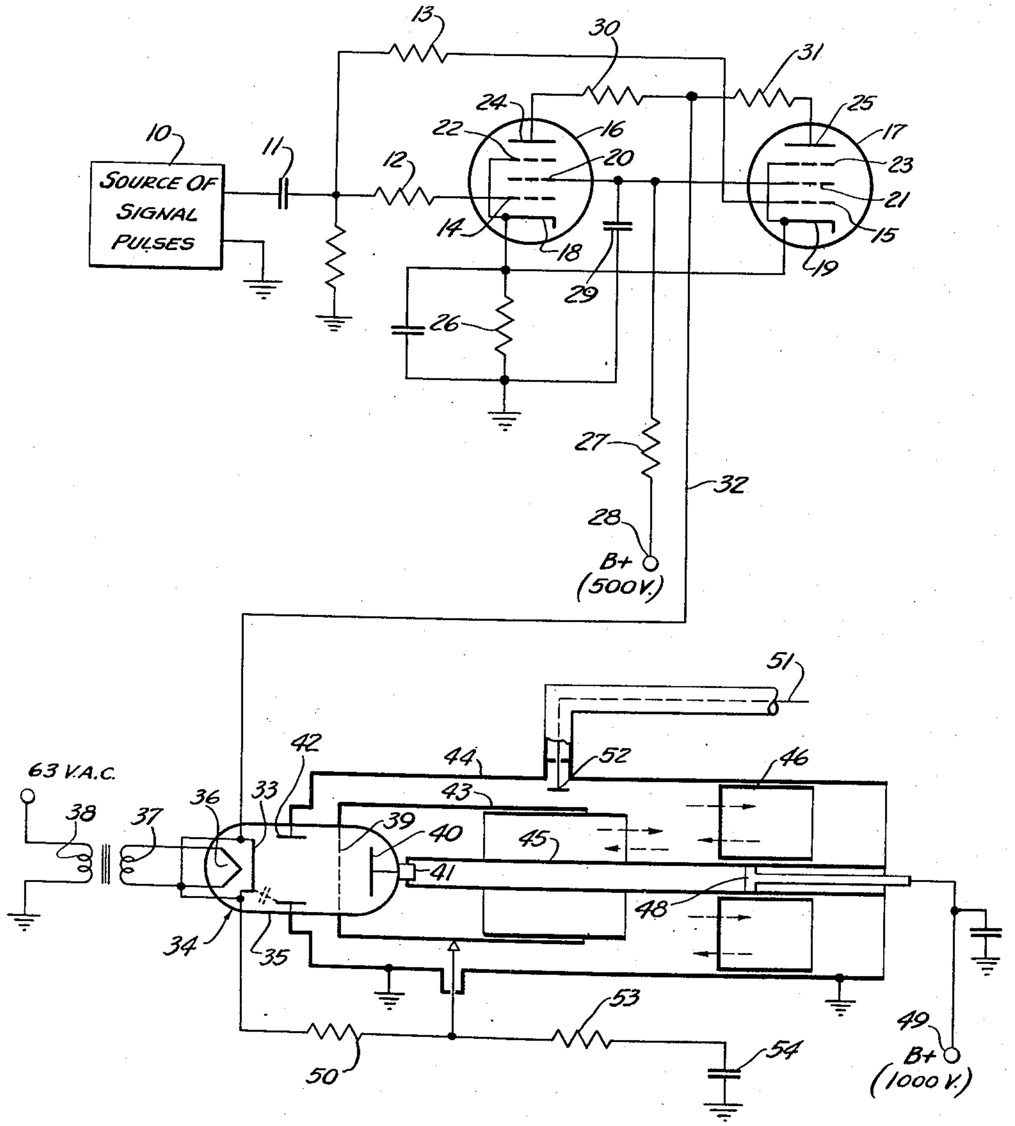
INVENTOR
FRANK T. LITTELL
BY Philip M. Bolton
ATTORNEY United States Patent Office 2,822,521

Patented Feb. 4, 1958

2,822,521

GRID NETWORK FOR PULSED OSCILLATOR

Frank T. Littell, Bergenfield, N. J., assignor to International Telephone and Telegraph Corporation, New York, N. Y., a corporation of Maryland Application December 23, 1953, Serial No. 399,955

1 Claim. (Cl. 332—9)

This invention relates to modulator systems and more particularly to pulse modulated oscillators.

A principal object of the invention is to provide an improved system for precisely starting and stopping an oscillator in correlation with the leading and trailing edges of a signal pulse.

Another object is to provide an improved pulse modulated oscillator of the cathode-modulated type.

A feature of the invention relates to a high frequency oscillator having a pulse controlled modulator therefor, which modulator has substantial capacitance across its output circuit, and circuit connections for preventing said capacitance from delaying the termination of the oscillations after the receipt of the trailing edge of a modulating pulse.

Another feature relates to an improved pulse-controlled oscillator-modulator for pulse time modulation systems and the like, whereby signals can be transmitted through a series of relays without delay-distortion of the trailing edge of the pulse to be relayed.

A further feature relates to the novel combination of parts and circuits which cooperate to provide an improved pulse modulated high frequency oscillator.

In one kind of system the pulses are applied to a modulator tube or modulator tube combination whose output controls a cathode driven high frequency oscillator. It is necessary for proper transmission, especially where a number of intervening relay stations are employed, to make sure that the oscillator begins and ceases generating a train of oscillations at the desired frequency exactly in accordance with the time of occurrence of the leading and trailing edges of each pulse. In other words, the duration of each high frequency oscillatory train should be exactly correlated with the leading and trailing edges of each pulse.

I have found that when such an oscillator-generator is of a type that employs special tuning mechanisms such as cavity resonators and the like, the output circuit of the modulator has presented to it a substantial capacitance. This capacitance is normally discharged through the plate-to-cathode impedance of the modulator tube during the period that the oscillator is generating oscillations. This is so because during the application of a pulse, the plate-to-cathode impedance of the modulator is very low. However, when the pulse terminates, the modulator is essentially cut off to plate current flow, and the said capacitance charges up through the impedance of the oscillator, which impedance is at this time gradually increasing, until the oscillator finally stops oscillating. This represents a long time delay in the restoration of the oscillator to its quiescent state, compared with the decay time of a signal pulse.

Heretofore, in order to overcome this condition it has been proposed to connect the plate of the oscillator tube directly to the cathode through a suitable resistance. However, the value of this resistance had to be a compromise between providing a desirable low impedance charge path to take effect at the end of each pulse, and the attainment of a desirably high voltage across the plate and cathode of the oscillator during the existence of the pulse. With this prior arrangement, these two conditions were mutually opposed. The present invention provides a practical solution to the problem.

Referring to the drawing, which shows an exemplification of a preferred embodiment of the invention, the block 10 represents any well-known source of pulse signal, each pulse having a substantially vertical leading edge and a substantially vertical trailing edge. Such sources are well known in the art and are conventionally used in so-called pulse time modulation systems and the like. The pulse from source 10 is applied through condenser 11, thence in parallel through resistors 12 and 13 to the control grids 14 and 15 of respective grid-controlled modulator tubes 16 and 17. Merely for purposes of illustration, the tubes 16 and 17 are of the pentode type having the usual electron emitting cathodes 18 and 19, the control grids 14 and 15, shield grids 20 and 21, the suppressor grids 22 and 23, and the output anode or plates 24 and 25. In the particular arrangement shown in the drawing, the tubes 16 and 17 are connected in parallel, with their cathodes 18 and 19 directly connected together and returned to ground through a suitable bias resistor 26, and bypassed by the usual bypass capacitor. Likewise, the shield grids 20 and 21 are connected together and through a resistance 27 to a suitable positive voltage tap 28 on the direct current power supply. The resistance 27 is bypassed by the usual by-pass capacitor 29. The suppressor grids 22 and 23 are connected directly to their respective cathodes 18 and 19. Likewise, the plates 24 and 25 are connected through respective resistors 30, 31, and thence by conductor 32 to the electron emitting cathode 33 of a grid controlled oscillator tube 34. The tube 34 is of any type well known in the art of generating ultra-high frequencies. It may, for example, be a tube of the so-called "Lighthouse" type or type 2C43. As is well known, this particular type of tube comprises an evacuated glass bulb or envelope 35. Suitably mounted within the bulb 35 is the electron emitting cathode 33 with its heater element 36. Heater 36 is supplied with low voltage alternating current from the secondary winding 37 of a so-called filament transformer. Also mounted within the tube 34 is a control grid 39 and an anode 40 which is provided with the cylindrical anode cap 41 for external connection in the circuit.

This type of tube also has a metal shield schematically represented by the numeral 42 which is connected to the cathode 33, through a built-in bypass capacitor inside the tube. The elements 39 and 42 may be provided with the usual disc seals which extend radially and circumferentially outwardly of the bulb 35 for connection to coaxial telescoped tubular transmission line conductor 43 and line 44. Likewise, the external cylindrical connection cap 41 for the anode 40 is connected into the end of another coaxial tubular transmission line conductor 45. Coaxial tubular conductors 44 and 45 form a well-known resonant cavity whose tuning can be controlled in a well-known manner by the slidable plunger 46. The plunger 46 is not in direct current contact with conductors 44 and 45, but the plunger, being a quarter wavelength long, presents a very low impedance in the high frequency return path between the conductors 44 and 45. For the purpose of applying high voltage direct current potential to the plate 40, the tubular conductor 45 has a slidable plunger 48 which is connected to the high voltage direct current tap 49 on the direct current power supply. The position of plunger 48 can be adjusted in the well-known manner to prevent the passage of high frequency current from the oscillator into the power supply.

The plate circuit of the tube 34 is tuned in accordance with the effective length of the line 45 which can be varied by changing the position of the plunger 46. The grid circuit is tuned by changing the length of the telescoped transmission line 43. By suitable adjustment of the elements 43 and 46, the tube 34 oscillates as a tuned grid, tuned plate oscillator. The control grid 39 is provided with a grid leak resistor 50, one end of which is connected to the tubular transmission line conductor 43. For the purpose of connecting the output of the oscillator to a suitable transmission line 51, for example, of the coaxial type, a capacitance probe 52 is mounted in adjustable spaced relation with respect to the tubular grid line conductor 43, this probe, of course, being insulated from the cathode line conductor 44.

With the circuit arrangements as so far described the plate-to-cathode path inside each of the modulator tubes 16 and 17, is effectively in series with the plate-to-cathode path inside the oscillator tube 34. Thus the plate-to-cathode internal path of tube 34 acts as a plate load for the modulator tubes 16 and 17. In other words, the direct current plate potential for each of the plates 24, 25, is supplied from the high voltage direct current terminal 49, thence between the plate 40 and cathode 33 over conductor 32 through resistances 30 and 31, plates 24 and 25, and thence in parallel to ground through the respective cathodes 18 and 19, and the bias resistor 26. Normally, that is, when no signal pulse is applied to the grids 14 and 15, the tubes 16 and 17 are operating at low plate current and, therefore, the direct current voltage at the cathode 33 of the oscillator approaches the direct current voltage at anode 40. When a positive signal pulse is applied to the grids 14 and 15, the tubes 16 and 17 become highly conductive. This, in effect, causes a large drop in the potential of the cathode 33 with respect to its anode 40. In other words, in the presence of a positive signal pulse a high voltage appears across the cathode 33 and the anode 40, causing the tube 34 to oscillate for the duration of the pulse.

However, there is an effective and substantial capacitance across the output of the modulator tubes, which capacitance consists of the sum of the normal output capacitances of the said tubes 16 and 17, the capacitance to ground of the filament transformer, and the capacitance between the cathode 33 and the end of the resonant tuning cavity. During the period that the positive pulse is applied to the modulator tubes, the above-noted capacitance is quickly discharged through the low impedance of the plate circuits of the said modulator tubes. However, when the pulse terminates and the tubes 16 and 17 are operating at low plate current, in order that the oscillator may be restored to its quiescent condition, the said capacitance must charge up until the voltage of cathode 33 again approaches the direct current voltage at plate 40. Ordinarily this charge time would be long compared to the decay time of the signal pulses. Heretofore, this condition has been partly solved by connecting a relatively high value resistor, for example a resistor of 5,000 ohms, directly across the plate and cathode of tube 34. Of course, the lower this resistance was, the less chance there was of abnormal delay in the oscillator restoring to its quiescent condition. However, in order to restore the oscillator as fast as possible, such a resistance would have to be so small that sufficient oscillatory voltage could not be developed across the plate and cathode of the oscillator tube during the period when the signal pulse is on. The prior arrangement, therefore, represented a compromise and the end result was an oscillating pulse with a relatively long trailing edge.

I have found that this direct resistance connection between the plate and cathode can be eliminated while at the same time retaining the high value of oscillatory voltage and still reproducing the signal pulse at the output with high fidelity. For this purpose the grid 39 is connected to ground through a series path comprising resistor 53 and condenser 54. For example, if the tube 34 is a well-known "Lighthouse" or 2C43 type, the resistance 53 may be as low as 2,500 ohms and the capacitor 54 may be .05 mf. This also usually requires a much higher grid leak resistor 50 to be employed. For example, as in the prior known arrangement the grid leak resistor with the particular type of tube mentioned was 220 ohms. With the circuit as disclosed herein the grid leak resistor may be 820 ohms. Furthermore, the connections as described result in the desired correlation between the active and quiescent states of the oscillator with the leading and the trailing edges respectively of the signal pulse while maintaining the desired power input and power output of the system. One explanation why this circuit arrangement operates satisfactorily is that during the decay of the pulse a positive bias is produced on the grid 39 affording a low resistance path between the plate and cathode of tube 34 through which the output capacitance of the modulator tubes can be rapidly charged to bring the cathode 33 to the quiescent voltage. In any event, it has been found that the particular circuit as described enables the faithful reproduction of signal pulses when the pulses are transmitted through such systems as pulse time modulation systems employing a series of repeater stations. This problem was particularly troublesome when the oscillator was of the cavity tuned and cathode modulated type. The result was that in some instances the trailing edge of a pulse was undesirably lengthened, causing the leading edge of the following pulse to be incorrectly time displaced.

Various changes and modifications may be made in the disclosed embodiment without departing from the spirit and scope of the invention.

What is claimed is:

A pulse modulator-oscillator system, comprising a grid-controlled modulator tube, means to apply a modulation pulse to the input of said modulator tube, a grid-controlled oscillator tube having its cathode driven by the output of said modulator tube, a tuning device for said oscillator, said system producing a substantial capacitance across the output of said modulator tube which capacitance is in series with said oscillator tube and so as to be charged solely therethrough and means comprising a resistance-capacitance network connecting the grid of said oscillator tube to ground for producing rapid charging of said capacitance upon termination of the modulating pulse to thereby produce rapid cut-off of the oscillations of the oscillator.

References Cited in the file of this patent

UNITED STATES PATENTS

| | | |
|---|---|---|
| 2,458,574 | Dow | Jan. 11, 1949 |
| 2,643,340 | Lawrance | June 23, 1953 |